April 8, 1969  F. S. ATWATER  3,437,307
MOLD FOR FILLING A TRUNCATED BALL TO BE GROUND
Original Filed April 30, 1964
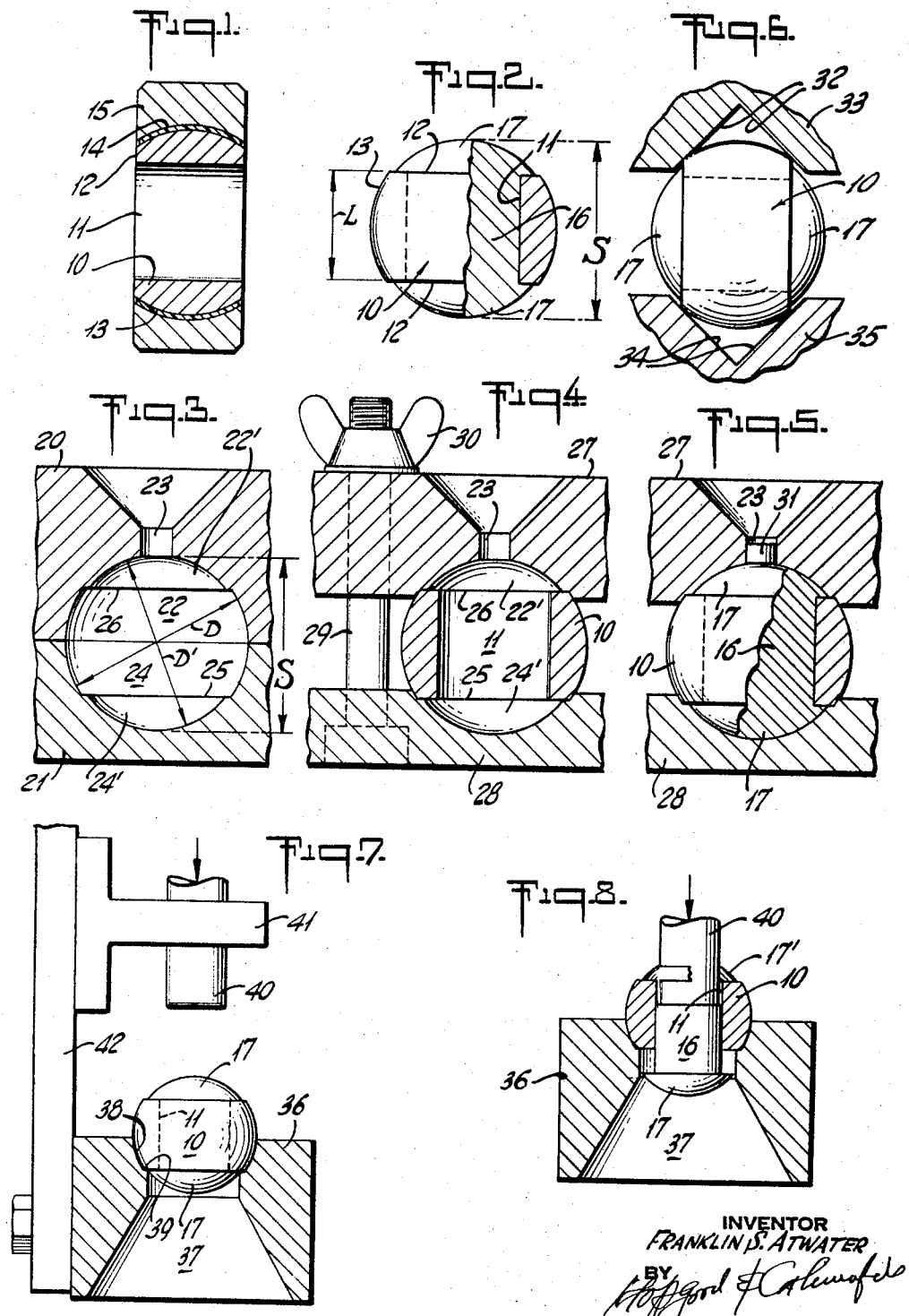
INVENTOR
FRANKLIN S. ATWATER
BY
ATTORNEYS

United States Patent Office 3,437,307
Patented Apr. 8, 1969

3,437,307
MOLD FOR FILLING A TRUNCATED BALL TO BE GROUND
Franklin S. Atwater, New Britain, Conn., assignor, by mesne assignments, to Textron, Inc., Providence, R.I., a corporation of Delaware
Original application Apr. 30, 1964, Ser. No. 363,889, now Patent No. 3,299,583, dated Jan. 24, 1967. Divided and this application Nov. 16, 1966, Ser. No. 594,822
Int. Cl. B22d 19/00
U.S. Cl. 249—91    2 Claims

ABSTRACT OF THE DISCLOSURE

A mold is provided for filling a truncated ball to be ground, the ball having opposed flat end faces defining the truncated ends thereof and a bore extending between said end faces. The mold is composed of a lower mold part having an upwardly facing generally spherical cavity adapted to receive and concentrically locate one of the end faces of the ball and an upper molds part having a downwardly facing generally spherical cavity adapted to engage and be concentrically located by the other of said end faces, the span between concave-surface centers of the upper and lower mold parts when so located being at least no greater than the diameter of the ball, one of the mold parts having an opening for accommodating material to be molded in both cavities and the bore.

---

This application is a division of my copending U.S. application S.N. 363,889 filed Apr. 30, 1964, now Patent No. 3,299,583, which invention relates to the precision-finishing of truncated balls, as, for example, those which find ultimate use of the self-aligning inner ring of a bearing having freedom for self-alignment within a concave spherical outer retaining ring member.

An inner ring of the character indicated may actually be the outer-race ring of an anti-friction bearing, meaning that its race accommodates plural balls, rollers or pins, in central supporting relation with an inner-race ring. On the other hand, an inner ring of the character indicated may provide plain-bearing journalled support for a shaft or may be non-rotatively attached to a bracket or other part. In any event, the inner ring or truncated ball as contemplated herein has a spherical outer surface which is truncated to define opposed end faces and which has a bore extending between such end faces.

In bearings of the character indicated, and particularly in certain of those known as plain spherical bearings where both intermittent rotation and self-alignment are to be accommodated at the outer spherical surface thereof, it is particularly important to assure sphericity of that surface within very close limits. For example, sphericity must be held ±0.001 inch on a three-point gage, whether the spherical surface diameter is one-half inch or two inches. In the past, such inner rings have been made by the successive steps of rough-machining on automatic-screw machines (or forged from bar or wire stock), hardening, facing to define the truncations, grinding the bore, rough-grinding and finish-grinding the spherical surface, and finally barrel-rolling. This procedure has been found to be slow and costly, and true sphericity has been hard to achieve. The spherical surfaces were ground on standard oscillating grinders or on external form grinders; about 0.0002-in. stock had to be left on (after grinding) to allow for barrel-rolling, and the barrel-rolling operation required from 14 to 48 hours to accomplish the desired cutting and burnishing operations. All in all, such prior techniques are found to be unacceptable.

It is, accordingly, an object of the invention to provide an improved method of fabricating spherical rings of the character indicated.

A specific object is to provide such rings of superior spherical surface contour, using standard ball-finishing techniques as much as possible.

A general object is to meet the above objects with a method adaptable to mass-production, and having inherent capacity to reproduce to closely held tolerances as to sphericity, with minimum rejection rate and low cost.

Other objects and various further features of novelty and invention will be pointed out or will occur to those skilled in the art from a reading of the following specification in conjunction with the accompanying drawings. In said drawings, which show, for illustrative purposes only, preferred embodiments of the invention:

FIG. 1 is a vertical sectional view of a plain spherical bearing having an inner ring or truncated ball finished in accordance with the invention;

FIG. 2 is a side-elevation view of the inner ring or truncated ball of FIG. 1, conditioned for a finishing operation of the invention, parts being broken to reveal a vertical section;

FIG. 3 is a sectional view through a mold of the invention;

FIGS. 4 and 5 are views similar to FIG. 3 but illustrating a modification, before and after injecting molding material;

FIG. 6 is a simplified sectional view through the spaced grooved plates of a ball-grinding machine in which the conditioned ring of FIG. 2 is supported; and FIGS. 7 and 8 are simplified sectional views of a punch-out device, before and during operation thereof.

Briefly stated, the invention contemplates the improved finishing of a bearing ring or truncated ball which is a centrally bored sphere truncated at opposite ends of the bore by flat end faces. Molding techniques are employed to cast a temporary core in locked relation with the bore and integral with headed ends which are rounded to something just short of the ultimate sphere to which the ring surface is to be ground and lapped. These latter operations are performed by conventional ball-grinding and lapping machines. Thereafter the temporary core is removed, and such final finishing performed as is desired.

In FIG. 1 there is illustrated a complete plain spherical bearing comprising an inner ring or truncated ball 10 having a central bore 11 extending between opposed flat end faces 12. The outer convex surface 13 of ring 10 is spherically contoured for sliding contact with and support by the low-friction liner 14 on the inner surface of an outer bearing ring 15. The liner 14 may include a fabric having Teflon fibers woven therein.

In accordance with the invention, a superior spherical surface 13 is developed by casting a core 16 in locked relation with the ring 10 so that the truncated ball or sphere of ring 10 can resemble a full sphere, for purpose of utilizing conventional gall-finishing equipment to grind and lap the desired contour of surface 13. The core 16 is shown as a one-piece casting having integral head portions 17 which are rounded to fill out the truncated end of the desired sphere. However, to avoid grinding or lapping the core material, the spherical radial extent of heads 17 (or at least the span S between convex-surface centers of heads 17) is preferably just short of the ultimate sphere to which surface 13 is to be finished. Not only does this proportioning of heads 17 assure against core material contaminating the ball-finishing machines, but the core material is itself preserved against contamination and may be fully recovered for recycled use.

Alternative core-mold arrangements are shown in FIG. 3 and in FIGS. 4 and 5, respectively, but the basic cavity requirements are best illustrated in FIG. 3. In FIG. 3, the mold compises upper and lower parts 20–21 which, when clamped (by means not shown), together define cooperating halves of a cavity, the upper half 22 of which has a molding cavity 22' which is served by a flared sprue hole 23 for introduction of molding material. The lower cavity half 24 is characterized by a region of diameter D for retention and location of the underground truncated ball or ring 10, and a circumferentially continuous shoulder 25 provides a seat for the periphery of one of the end faces 12. Below shoulder 25 in lower cavity half 24 is a bottom cavity molding part 24' which is preferably of slightly lesser but concentrically located spherical contour, as of the lesser diameter D'. An upper shoulder 26, similar to shoulder 25, is formed in the upper cavity half 22, and above shoulder 25 the molding cavity part 22' is preferably characterized by the lesser diameter D'. Whether or not the pair of molding cavities 22'–24' are strictly spherical, the span between concave-surface centers of these halves should not exceed the span S alluded to in reference to FIG. 2, being just short of the ultimate geometrical sphere to which surface 13 is to be finished. In practice, it has been found that highly satisfactory results are obtained for a lesser diameter D' which is 0.005 to 0.010-inch less than that of the ultimately lapped spherical surface 13, for ring diameters ranging from one-half inch to two inches.

The mold of FIGS. 4 and 5 represents the presently preferred form. It resembles the mold described for FIG. 3 in all respects except that the separate halves 27–28 do not come together but are really suitably contoured plates which are spaced by an inserted ring 10. Clamping means including a bolt 29 and wing nut 30 releasably hold the ring 10 and mold parts together during a molding operation. Shoulders 25–26 and molding cavities 22'–24' are preferably as described for FIG. 3. In casting, a small sprue length may remain, as suggested at 31, but this in no way impairs the ability to separate mold halves from the ring 10 with core 16 locked thereon. The projection 31 may be simply broken or ground off, as will be understood.

In the grinding operation and in the subsequent lapping operation, the core-locked ring 10 becomes one of a great number of "balls" sequentially fed in and processed in one of the several pairs of V-grooves in opposed surfaces of the grinding or lapping plates. Actually, core-locked rings 10 may be mixed in with steel balls in the same succession of grinding and lapping production, as long as the diameters to be finished and the steels to be ground are essentially the same. In FIG. 6, I illustrate the core-equipped ring 10 in the grinding process, located by walls 32 of one of the grooves in the upper plate 33 and by walls 34 of the corresponding groove 35 in the lower plate 36. In the grinding process, as in the lapping process, one of the plates 33 rotates with respect to the other, and the hundreds of "balls" in grooves 32–34 are subject to random orientation as they gyrate with relative motion of the walls of grooves 32–34. For V-grooves inclined 90° as shown, I have observed reliably predictable superior spherical surface generation on core-equipped rings 10 when the axial length L (FIG. 2) is in the order of 70 percent of the diameter D, under which condition full diametral support of ring 10 is assured between one face 32 and the opposite parallel face 34, regardless of orientation of ring 10. Acceptable spherical surfaces, of lesser precision at the truncation margins, have been obtained for L/D ratios as low as 50 percent.

The casting material for core 16 may be one of a number of available items, as long as its removal is complete without marring the ring 10. I have found standard printing-type lead, as used in linotype machines, to be well suited to the purpose, and I have also successfully employed a low-melting point special bismuth alloy marketed under the trade name Cerrobend, being a product of Cerro Corporation, 300 Park Avenue, New York, N.Y.

In using lead for the core 16, I find it best to "punch-out" the core, rather than trying to melt it out of position. A suitable punch is suggested in FIGS. 7 and 8 to comprise a base 36 having a central opening 37 beneath a seat 38 adapted to receive and locate a ground and lapped core-equipped ring 10; the bottom of seat 38 is, of course, sufficiently open to clear the full diameter of the adjacent core head 17, and a thin shoulder 39 (analogous to shoulders 25–26, FIGS. 3 and 4) serves to vertically orient the core axis. A ram 40 of diameter to safely clear the bore 11 is guided by means 41 on an upstanding bracket 42 for reciprocation in alignment with the core axis. Initial ram contact with the upper head 17 is followed by severance of a thin ring 17' (FIG. 8) so that the body 16 and lower head 17 can be cleanly discharged into opening 37. The final operations on the ring 10 are bore grinding and barrel-rolling (tumbling) using conventional techniques as needed.

In the use of the indicated low-melting alloy indicated, there is no need for the punching step to remove core 16. The alloy indicated has a melting temperature of 158° F., and this is so far below any temperature bothersome to the steel of ring 10 or its finish that mere subjection to such a low-melting environment is adequate, and the alloy may be fully recovered for recycled use.

It will be seen that I have disclosed an improved method for low-cost generation of superior spherical convex surfaces, in mass-production quantities. So reliable is my cast-core technique that cored rings may be intermixed with steel balls in any given loading of a ball-grinding or ball-lapping machine. The provision of core-head diameter D' close to but short of the ultimately ground spherical diameter D means that no core-equipped ring 10 will "foul" an adjacent similar ring 10 sufficiently to inhibit the normal gyrating ball rotation of conventional ball-grinding. Furthermore, the shocks and stresses of such grinding and lapping are incapable of loosening the locked engagement of core 16 to ring 10, and thus no solid matter can project to impede normal "ball" rotation. The core material is never contacted by grinding surfaces and so the core material is neither contaminated, nor does it erode to "fill" or contaminate the grinding surfaces.

While the invention has been described in detail for preferred methods and molds, it will be understood that modifications may be made without departing from the scope of the invention as defined in the claims which follow.

I claim:

1. A mold for filling a truncated ball to be ground, said ball having opposed flat end faces defining the truncated ends thereof, and said ball having a bore extending between said end faces, a lower mold part having an upwardly facing generally spherical molding cavity of effective radius at least no greater than that of the ball, a circumferentially continuous locating shoulder defining the upper limit of said cavity, said shoulder being of a diameter to receive and concentrically locate one of said end faces with respect to said cavity, an upper mold part having a downwardly facing generally spherical molding cavity of effective radius at least no greater than that of the ball, a circumferentially continuous locating shoulder defining the outer limit of said upper molding cavity, whereby the cavity of said upper mold part may be concentrically located with respect to the other end face of the ball, one of said mold parts having an opening for accommodating material to be molded in both cavities and the bore, and releasable holding means for retaining both mold parts in concentrically located relation with said end faces during a molding operation.

2. A mold for filling a truncated ball to the ground, said ball having opposed flat end faces defining the truncated ends thereof, and said ball having a bore extending between said end faces, a lower mold part having an upwardly facing generally spherical molding cavity adapted to receive and concentrically locate one of said end faces, an upper mold part having a downwardly facing generally spherical molding cavity adapted to engage and be concentrically located by the other of said end faces, the span between concave-surface centers of said upper and lower mold parts when so located being at least no greater than the diameter of the ball, one of said mold parts having an opening for accommodating material to be molded in both cavities and the bore, and releasable holding means for retaining both mold parts in concentrically located relation with said end faces during a molding operation.

References Cited

UNITED STATES PATENTS

| 1,936,863 | 11/1933 | Skillman. | |
|---|---|---|---|
| 2,703,470 | 3/1955 | Porter et al. | 51—60 |
| 3,114,992 | 12/1963 | Reardon | 51—284 |

FOREIGN PATENTS 858,058  12/1952  Germany.

J. SPENCER OVERHOLSER, *Primary Examiner.*

J. S. BROWN, *Assistant Examiner.*

U.S. Cl. X.R.

164—98; 249—83, 87